US010846805B2

(12) United States Patent
Allin et al.

(10) Patent No.: US 10,846,805 B2
(45) Date of Patent: Nov. 24, 2020

(54) METHODS AND SYSTEMS FOR THE CREATION, SUBMISSION AND EVALUATION OF CONSTRUCTION BID PACKAGES

(71) Applicant: TEXTURA CORPORATION, Deerfield, IL (US)

(72) Inventors: Patrick J. Allin, Lake Bluff, IL (US); Mateen Khadir, Chicago, IL (US); Franco Turrinelli, Chicago, IL (US)

(73) Assignee: TEXTURA CORPORATION, Redwood Shores, CA (US)

( * ) Notice: Subject to any disclaimer, the term of this patent is extended or adjusted under 35 U.S.C. 154(b) by 235 days.

(21) Appl. No.: 15/310,206

(22) PCT Filed: Feb. 27, 2015

(86) PCT No.: PCT/US2015/018106
§ 371 (c)(1),
(2) Date: Nov. 10, 2016

(87) PCT Pub. No.: WO2015/131103
PCT Pub. Date: Sep. 3, 2015

(65) Prior Publication Data
US 2017/0161850 A1    Jun. 8, 2017

Related U.S. Application Data

(60) Provisional application No. 61/946,155, filed on Feb. 28, 2014.

(51) Int. Cl.
*G06Q 50/08* (2012.01)
*G06Q 10/10* (2012.01)
(Continued)

(52) U.S. Cl.
CPC ............. *G06Q 50/08* (2013.01); *G06Q 10/10* (2013.01); *G06Q 30/0611* (2013.01);
(Continued)

(58) Field of Classification Search
CPC ........ G06Q 50/08; G06Q 10/10; G06Q 30/06; G06Q 40/40
(Continued)

(56) References Cited

U.S. PATENT DOCUMENTS 7,089,203 B1    8/2006   Crookshanks
2001/0056395 A1  12/2001  Khan
(Continued)

OTHER PUBLICATIONS

EP Supplemental Search Report in EP Application No. 15754426.3 filed on: Sep. 8, 2016 dated Sep. 8, 2017 (5 pages).
(Continued)

*Primary Examiner* — Florian M Zeender
*Assistant Examiner* — Nicole Elena Bruner
(74) *Attorney, Agent, or Firm* — Kraguljac Law Group, LLC

(57) ABSTRACT

Systems and methods for creating bid requests, creating bid packages, and evaluating bid packages. One method includes receiving a bid definition including a plurality of data items. The method also includes sending a notification of the bid request to a bid provider and making the bid definition accessible to the bid provider. In addition, the method includes receiving a plurality of data items associated with the bid provider corresponding to the plurality of data items included in the bid definition and receiving a release date for at least one of the plurality of data items associated with the bid provider. The method also includes automatically generating a bid package based on the plurality of bid response data items, storing the bid package, and
(Continued)

receiving a request to access the bid package. Access to the stored bid package is controlled based on the release date.

20 Claims, 18 Drawing Sheets

(51) Int. Cl.
  *G06Q 30/06* (2012.01)
  *G06Q 50/10* (2012.01)
  *G06F 17/40* (2006.01)
(52) U.S. Cl.
  CPC ............. *G06F 17/40* (2013.01); *G06Q 30/06* (2013.01); *G06Q 50/10* (2013.01)
(58) Field of Classification Search
  USPC .......................................................... 705/24
  See application file for complete search history.

(56) References Cited

U.S. PATENT DOCUMENTS

| | | | |
|---|---|---|---|
| 2003/0101127 A1 | 5/2003 | Cornelius | |
| 2005/0234811 A1* | 10/2005 | Herman | G06Q 30/08 705/37 |
| 2006/0069638 A1* | 3/2006 | Hotta | G06Q 40/04 705/37 |
| 2008/0162330 A1* | 7/2008 | Atkinson | G06Q 30/0601 705/37 |
| 2009/0030835 A1* | 1/2009 | Burns | G06Q 40/04 705/37 |
| 2010/0042556 A1 | 2/2010 | Erickson | |
| 2010/0274682 A1* | 10/2010 | Pai | G06Q 30/00 705/26.1 |
| 2011/0131114 A1 | 6/2011 | Al-Mubarak et al. | |
| 2011/0282714 A1* | 11/2011 | Cullen, III | G06Q 10/06 705/7.38 |
| 2011/0302090 A1* | 12/2011 | Newpol | G06Q 10/06 705/301 |
| 2013/0290135 A1 | 10/2013 | Borza | |

OTHER PUBLICATIONS

Patent Cooperation Treaty (PCT), International Search Report and Written Opinion, issued in International Application No. PCT/US2015/018106, International Filing Date: Feb. 27, 2015 dated Jun. 24, 2015 (9 pages).

* cited by examiner

Textura

Jim Morrison | My Company

Dashboard | Workspace | Messaging | Directory | Form Library | Reports | support@gradebeam.com Home > Breadcrumb    Call 1-866-482-7669

Project Name: Leveling Matrix Layout    1000

| NAME | OWENER | PROJECT EXECUTIVE | ADDRESS |
|---|---|---|---|
| Textura Corporation | Jim Morrison | David Grohl | 1405 Lake Cook Road Chicago, IL 60613 |

Additional Details

| CONTRACT VALUE | PROJECT MANAGER | PRIMARY CONTACT | START DATE |
|---|---|---|---|
| $12,345,678.90 | Lemmy Killmeister | James Hetfield | May 11, 2015 |

Details

Lorem ipsum dolor sit amet, consectetur adipiscing elit. Nunc eu eleifend nisl, et lacinia lectus. Nullam nulla nisl, tinciduct ac ultricies sed, condimentum vel quam. Vivamus eget nulla ac metus faucibus convillis aliquam vitae ipsum. Quisque porta mi non dolor ultrices, in tincidunt mauris mollis. Aliquam loborits sagittis mi, dictum mattis quam. Donec sagittis risus vehicula augue pellentesque, quis aliquet lectus pulvinar. Sed vel pellentesque leo. Integer maximus, ex quis aliquet maximus, risus liqula lacinia nibh, id commodo odio dui nec lectus. Integer viverra vehicula tellus sed condimentum. Cras sed scelerisque neque (more...)

PACKAGE NAME: CONCRETE    1002

[Package Details] [Bid Submission]

Events

| NAME | EXP DATE | TIME |
|---|---|---|
| Construction Start | Dec 31, 2015 | |
| Construction End | Dec 31, 2015 | |
| Bid-Due Date | Dec 31, 2015 | 11:00 am |
| Walkthrough Start-date | Dec 31, 2015 | 11:00 am |
| Walkthrough End-date | Dec 31, 2015 | 11:00 am |

Team Members

| NAME | TITLE |
|---|---|
| Jim Morrison | Estimator |
| John Desmore | Owner |
| Robby Kreiger | Architect/Engineer |
| Ray Manzerek | Editors |

Package Description

Lorem ipsum dolor sit amet, consectetur adipiscing elit. Nunc eu eleifend nisl, et lacinia lectus. Nullam nulla nisl, tinciduct ac ultricies sed, condimentum vel quam. Vivamus eget nulla ac metus faucibus convillis aliquam vitae ipsum. Quisque porta mi non dolor ultrices, in tincidunt mauris mollis. Aliquam loborits sagittis mi, dictum mattis quam. Donec sagittis risus vehicula augue pellentesque, quis aliquet lectus pulvinar. Sed vel pellentesque leo. Integer maximus, ex quis aliquet maximus, risus liqula lacinia nibh, id commodo odio dui nec lectus. Integer viverra vehicula tellus sed condimentum. Cras sed scelerisque neque. Morbi finibus elementum nisl vitae ornare. Quisque augue nisi, porta porta faucibus vitae, volutpat viverra ante. Proin varius dictum nisi, ac vehicula felis accumsan non.

FIG. 10

| Concrete Supporting Documents |
| --- |

Attach Qualifications*  ❖NOTES    (Attach)   ATTACHMENTS
    x Document Name
    x Another Document Name
    x Even Another Random Docume...

Attach proof of bonding and insurance  (Attach)
❖NOTES

Attach references  (Attach)
❖NOTES

| Add Certifications |
| --- |

Enter certifications
❖NOTES

B *I* U  ≡ ≔

Lorem ipsum dolor sit amet, consectetur adipiscing elit, sed so tempor incididunt ut labore et dolore magna aliqua. Ut enim ad minim veniam, quis nostrud exercitation ullamco laboris nisi ut aloquip ex ea commodo consequat. Duis aute irure dolor in repre...

| Terms and Conditions |
| --- |

❖NOTES
Lorem ipsum dolor sit amet, consectetur adipiscing elit. Nunc eu eleifend nisl, et lacinia lectus. Nullam nulla nisl, tinciduct ac ultricies sed, condimentum vel quam. Vivamus eget nulla ac metus faucibus convillis aliquam vitae ipsum. Quisque porta mi non dolor ultrices, in tincidunt mauris mollis. Aliquam loborits sagittis mi, dictum mattis quam. Donec sagittis risus vehicula augue pellentesque, quis aliquet lectus pulvinar.

BID BREAKDOWN | Due Date: Jan 21, 2015

« Concrete

| | | | | | |
|---|---|---|---|---|---|
| Rebar lbs. | 1,000 | 1,100 | 2,000 | 500 | 1,500 |
| Rebar Price $USD | $2,600.00 | ⊞ $3,500.00 | ⊞ $4,300.00 | $5,400.00 | $4,800.00 |
| Concrete Materials Tons | 3,000 | ⊞ 2,950 | | 0 | ⊞ 900 |
| Concrete Materials Price $USD | $52,000.00 | $48,750.00 | | 30,900.00 | $55,550.00 |
| Additional Labor Costs $USD | $0.00 | $0.00 | | $0.00 | $0.00 |
| Section Sub Total #USD | $54,600.00 | $52,250.00 | | 36,300.00 | $60,350.00 |

PLEASE SELECT:
○ Adjusted Entry
○ Negotiated Entry
○ Pull From Estimate
○ Bidder's Entry
☑ ✕

» Plumbing

| | | | | | |
|---|---|---|---|---|---|
| Section Sub Total #USD | $22,750.00 | $21,150.00 | $19,050.00 | $24,330.00 | $18,990.00 |

« Certifications

| | | | | | |
|---|---|---|---|---|---|
| Please Enter Certifications | | View Information | View Information | View Information | View Information |

CERTIFICATIONS

Lorem ipsum dolor sit amet, consectetur adipiscing elit, sed so eiusmod tempor incididunt ut labore et dolore magna aliqua. Ut enim ad minim veniam, quis nostrud exercitation ullamco laboris nisi ut aloquip ex ea commodo consequat. Duis aute irure dolor in reprehenderit in voluptate velit esse cillum dolore eu fugiat nulla « Inclusions

| | | | | | |
|---|---|---|---|---|---|
| Include | | $56,350.00 | $48,550.00 | es / No | Yes |
| Include | | | | 03 | Yes |
| Section Sub Total #USD | $52,750.00 | | $51,000.00 | | $50,750.00 |

FIG. 14 Cont. 1

| ⌂ Electrical | | | | | |
|---|---|---|---|---|---|
| Wiring Qty | 1,000 | 1,000 | 1,000 | 1,000 | 1,000 |
| Wiring Price $USD | $5,600.00 | $5,370.00 | $4,990.00 | $6,650.00 | $5,720.00 |
| Light Fixtures Qty | 1,000 | 1,000 | 1,000 | 1,000 | 1,000 |
| Light Fixtures Price $USD | $42,440.00 | $44,050.00 | $43,570.00 | $41,030.00 | $45,070.00 |
| Additional Labor Costs $USD | $0.00 | $0.00 | $0.00 | $0.00 | $0.00 |
| Section Sub Total #USD | $48,040.00 | $49,420.00 | $48,560.00 | $47,680.00 | $50,790.00 |

|◁ ◁ [ 1 ] /15 ▷ ▷|    Showing 1-10 of 150    [ 10 ▼ ]    Records of 150 Total

FIG. 14 Cont. 2

METHODS AND SYSTEMS FOR THE CREATION, SUBMISSION AND EVALUATION OF CONSTRUCTION BID PACKAGES

RELATED APPLICATIONS

This application claims priority to U.S. Provisional Application No. 61/946,155, filed Feb. 28, 2014, the entire content of which is hereby incorporated by reference.

FIELD

Embodiments of the present invention relate to systems and methods for creating, submitting, and evaluating construction bid packages.

SUMMARY

Although manual processes exist for generating bid requests and submitting bid packages in response to these requests, these processes are difficult to manage, time-consuming, and error-prone. For example, bid packages are typically prepared and submitted in a variety of formats including email, fax, and postal mail. The contents of the bid package are also often organized, grouped, and categorized differently by each subcontractor (hereinafter referred to as a "bid provider"). Bid packages also often include different levels of detail and various combinations of inclusions and exclusions. Therefore, a property developer or a general contractor (hereinafter referred to as a "bid solicitor") cannot easily compare submitted bids on a side-by-side basis.

Furthermore, a bid solicitor often requires that submitted bid package be approved by multiple individuals and, sometimes, in a specific sequence. These requirements can cause further delay and errors when performed manually.

Further yet, using manual methods, a bid provider cannot prevent a bid solicitor from viewing a submitted bid package prior to the deadline for the bid package. In particular, a bid provider generally does not want the bid solicitor or any third party to learn the provider's bid amount or associated details prior to the deadline because this information may allow other parties to adjust their bid packages accordingly. Therefore, bid providers often wait to submit a bid package until the deadline regardless of whether the bid package is complete prior to the deadline. By waiting until the deadline to submit a bid package, a bid provider runs the risk of being unable to timely submit the package (e.g., forgetting about the deadline or not having sufficient time to submit the package by the deadline due to unforeseen circumstances on the deadline). Also, in some situations, a bid provider may intentionally decide not to submit a bid package for a particular bid request if the deadline conflicts with the provider's schedule for that date (e.g., due to other bid packages being due on the same day). Also, if a bid provider chooses not to submit a bid package prior to the deadline for the reasons set forth above, the bid provider loses the opportunity to receive feedback from the bid solicitor or make alterations to the bid package (e.g., on less competitive portions of a bid package) prior to the deadline. Accordingly, if a bid package is missing information as of the deadline, the bid solicitor may not consider the bid package regardless of whether the bid package represents an optimal bid. Furthermore, even if a bid solicitor can identify that a bid package is missing particular information, making a manual request for additional information or clarification is difficult to manage, time-consuming, and error-prone.

Therefore, embodiments of the invention provide systems and methods for compiling bid packages, submitting bid packages, evaluating bid packages, and combinations thereof.

In one embodiment, the invention provides a computer-based (e.g., computer-implemented) method for submitting bid packages for a construction project. The method includes receiving, from a bid solicitor, a bid definition for a bid request. The bid definition includes a plurality of data items and the bid request is associated with a deadline. The method also includes sending, to a bid provider, a notification of the bid request and making the bid definition accessible to the bid provider. In addition, the method includes receiving a plurality of data items associated with the bid provider, wherein each of the plurality of data items associated with the bid provider corresponds to one of the plurality of data items included in the bid definition. The method also includes receiving, from the bid provider, a release date for at least one of the plurality of data items associated with the bid provider through an interface accessible by the bid provider over a network connection.

The method also includes automatically generating a bid package based on the plurality of bid response data items, and storing the bid package to at least one database. The method further includes receiving, from the bid solicitor, a request to access the bid package through an interface accessible by the bid solicitor over a network connection. When the request is received prior to the deadline and prior to the release date, the method includes automatically preventing the bid solicitor from accessing the bid package. When the request is received prior to the deadline but after the release date, the method includes automatically preventing the bid solicitor from accessing the bid package except for the at least one of the plurality of bid response data items. When the request is received after the deadline, the method includes automatically allowing the bid solicitor to access the bid package.

In some embodiments, the method also includes parsing the bid package into a plurality of sub-packages, identifying a reviewer associated with each of the plurality of sub-packages, and, for each of the plurality of sub-packages, making the sub-package accessible to the identified reviewer and receiving, from the matched reviewer, an evaluation status for the sub-package. The evaluation status can include an approved status or a rejected status. The method can also include automatically assigning the bid package a provisional status, which includes automatically marking the bid package as provisionally accepted if each of the plurality of sub-packages has an evaluation status of approved and automatically marking the bid package as provisionally rejected if one or more of the plurality of sub-packages has an evaluation status of rejected. In addition, the method can include receiving, from the bid solicitor, a final status of the bid package. The method can also include notifying the bid provider of the final status of the bid package, the provisional status of the bid package, or the evaluation status of at least one of the plurality of sub-packages. The method can further including include automatically assigning the provisional status to the bid package by assigning the provisional status based on an essentiality status and the evaluation status of at least one of the plurality of sub-packages.

Sending the notification to the bid provider can include sending the bid provider a message, such as an email message, a text message, etc., or posting the notification in a publically-accessible area of a website.

Receiving the bid definition can include receiving a selection of one of a plurality of stored bid definitions.

Alternatively, receiving the bid definition can include creating, by the bid solicitor, a custom bid definition by selecting the plurality of data items.

Automatically generating the bid package can include formatting the bid package based on a template associated with the bid definition.

The plurality of data items associated with the bid provider can be received from the bid provider or automatically extracted from stored data. For example, the data items can be extracted from a profile associated with the bid provider or from a previously-created bid package associated with the bid provider. The data items can also be extracted based on historical data associated with the bid provider.

Another embodiment of the invention provides a system for submitting construction bids. The system includes a server including a processing unit. The processing unit is configured to receive, from a bid solicitor, a bid request including a plurality of data items and a deadline, the bid request associated with a construction project. The processing unit is also configured to send, to each of a plurality of bid providers, a notification of the bid request and make the bid request accessible to the plurality of bid providers. In addition, the processing unit is configured to receive, for each of the plurality of bid providers, a plurality of data items associated with the bid provider wherein each of the plurality of data items associated with the bid provider corresponds to one of the plurality of data items included in the bid request and receive, from each of the plurality of bid providers, a release date for at least one of the plurality of data items associated with the bid provider.

The processing unit is also configured to generate, for each of the plurality of bid providers, a bid package based on the plurality of data items associated with the bid provider and store the bid packages to at least one database. The processing unit is further configured to receive, from the bid solicitor, a request to access the bid packages. When the request is received prior to the deadline and prior to the release date, the processing unit is configured to prevent the bid solicitor from accessing the bid packages. When the request is received prior to the deadline but after the release date, the processing unit is configured to prevent the bid solicitor from accessing the bid packages except for the at least one of the plurality of data items included in each bid package and associated with the release date. When the request is received after the deadline, the processing unit is configured to allow the bid solicitor to access the bid packages.

The processing unit can also be configured to allow the bid solicitor to access the bid packages by displaying at least two of the bid packages side-by-side. In addition, the processing unit can be configured to receive from the bid solicitor a request for additional information for one of the bid packages and notifying the bid provider associated with the one of the bid packages of the request. The request can be received prior to the deadline.

Other aspects of the invention will become apparent by consideration of the detailed description and accompanying drawings.

BRIEF DESCRIPTION OF THE DRAWINGS

FIGS. 8-9 illustrate user interfaces for creating a bid request.

FIG. 10 illustrates a user interface displaying a notification of a bid request.

FIGS. 12-14 illustrate user interfaces for evaluating submitted bid packages.

DETAILED DESCRIPTION

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components. Also, the term "automatically" as used in the present application indicates functionality performed by software modules (executed by a processing unit) and/or hardware components without manual intervention.

Figure 1:
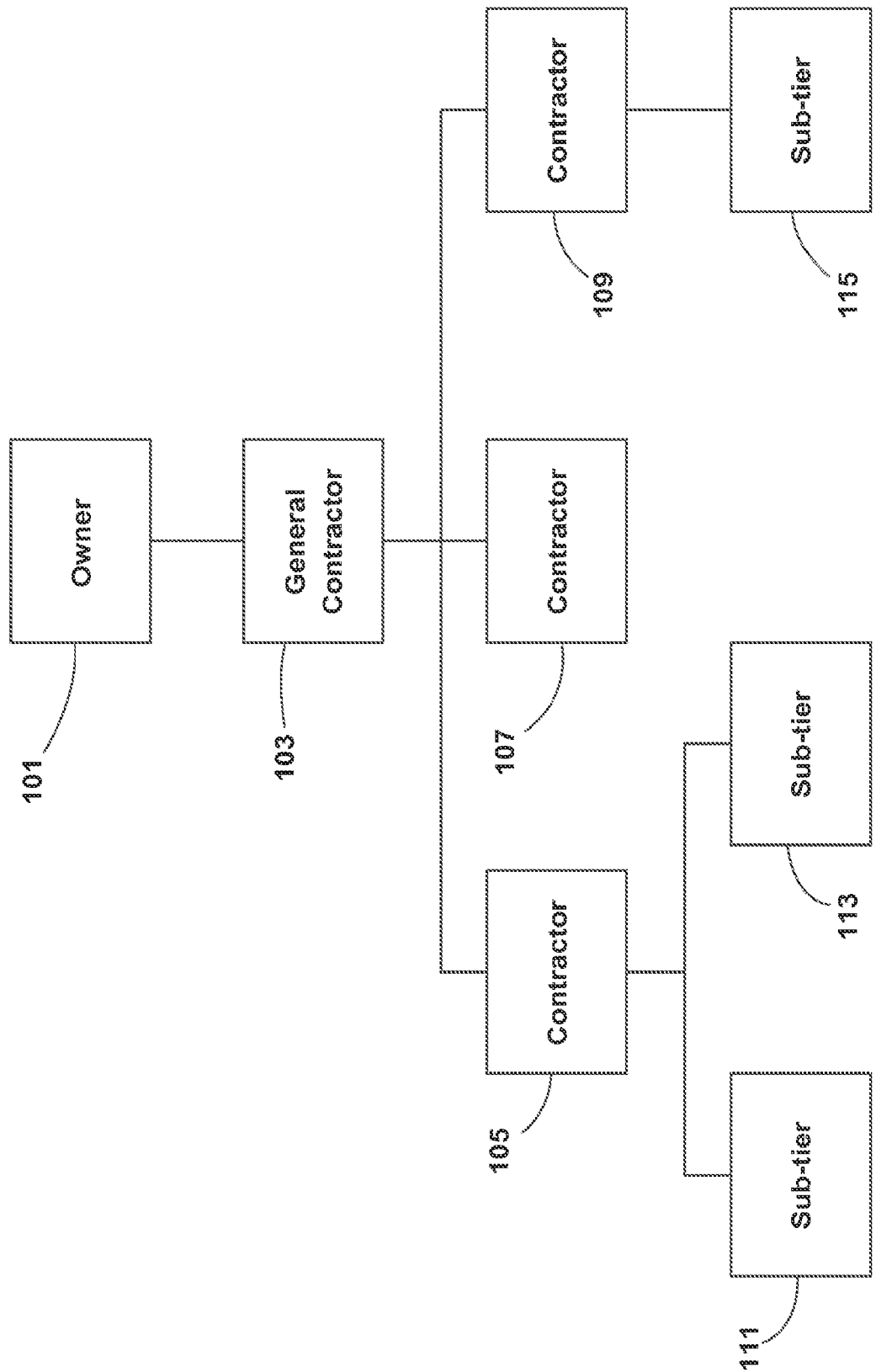
FIG. 1 is a block diagram of a hierarchically-organized construction project.

FIG. 1 illustrates an example of a hierarchically-organized construction project. The construction project is organized in support of an owner 101 of a project. The owner (or developer) 101 is typically the entity that ultimately puts the building to use (e.g., either by occupying, leasing or selling it). A general contractor ("GC") 103 is contracted to manage the overall project. The GC 103 also assumes a contractual responsibility for the delivery of the project and, in some cases, may play a role in the construction activities by self-performing some of the required construction. A GC 103 typically has a one-to-many relationship with projects. In other words, a single GC may manage multiple concurrent projects but each of those projects is typically managed by a single GC. However, projects may be managed by multiple GCs, including GCs performing as a joint venture or other combined entity.

The GC 103 will engage one or more contractors 105, 107, 109 to perform various construction specialties or to provide required materials for the project. The contractors (for example, subcontractors, material suppliers, and other vendors) work under the GC 103 to form a strict contractual hierarchy for the construction project. Each contractor 105, 107, 109 may engage one or more additional contractors 111, 113, 115 (e.g., sub-tier contractors, material suppliers, and other vendors), who provide services, equipment, labor, or materials under contract to the project.

When a property owner is preparing for a construction project, the property owner will typically request that GCs submit a bid package outlining a proposal for completing the construction project. Similarly, when a GC is preparing a GC bid package, the GC will request that sub-contractors submit bid provider bid packages outlining a proposal for completing a portion of the construction project. The GC will then create the GC bid package based at least in part on the one or more bid provider bid packages. As noted above, any entity requesting that another entity submit a bid package can be referred to herein as a "bid solicitor." Similarly, the entity submitting a bid package in response to a request from a bid solicitor can be referred to herein as a "bid provider." Although the examples herein generally refer to interactions between a bid solicitor and a bid provider, the systems and methods of this invention can be used to facilitate interactions between any organization requesting bid packages and any organization submitting a bid package in response. For example, a property owner can use the system to request and review bid packages from GCs for a project. Similarly, a materials supplier can use the system to submit bid packages directly to a GC or to submit bid packages to a subcontractor for a project.

As described above, manual bid submission processes are difficult to manage, time-consuming, and error-prone. For example, in manual methods, directly comparing bid packages is difficult if not impossible. In addition, complex manual review and approval processes introduce further delay and error in the bid package submission process. Furthermore, current submission methods do not allow bid providers to confidently submit bid packages prior to a specified deadline, which would otherwise allow the provider to receive feedback on the bid package and make adjustments as necessary.

Accordingly, as noted above, embodiments of the invention provide systems and methods for compiling bid packages, submitting bid packages, evaluating bid packages, and combinations thereof. This functionality allows users to make better decisions regarding bid packages, which leads to reduced errors and costs. Therefore, embodiments of the invention reduce the error and delay inherent in current bid submission and evaluation processes.

Figure 2:
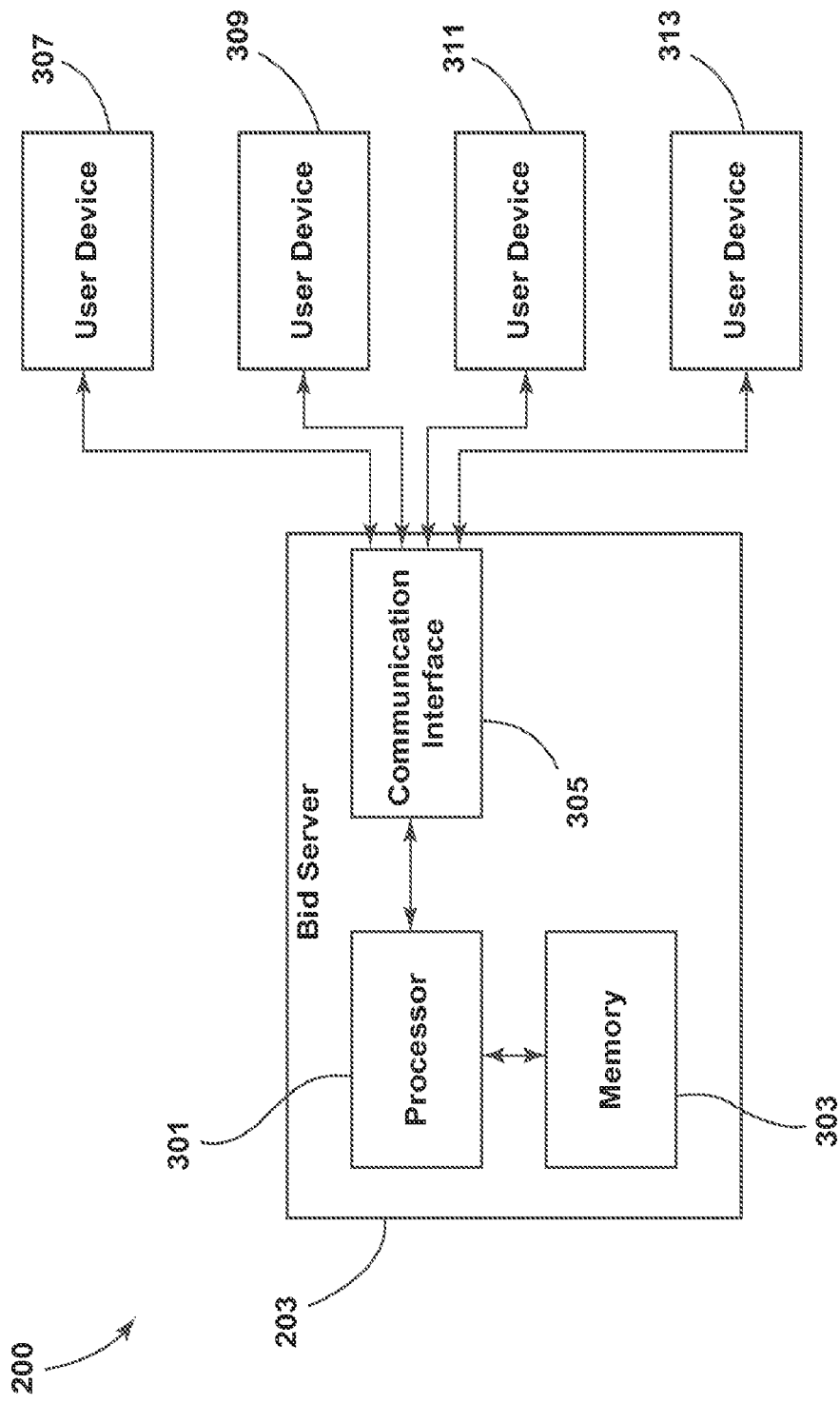
FIG. 2 is a block diagram of a bid package submission system.

For example, FIG. 2 illustrates a bid management system 200. The bid management system 200 includes a bid server 203. As illustrated in FIG. 2, the bid server 203 can include one or more processing units 301 (e.g., a microprocessor), one or more computer-readable memory modules 303 (e.g., including non-transitory memory, such as random access memory and/or read-only memory), and a communication interface 305. It should be understood that in some embodiments, the bid server 203 includes additional components. It should also be understood that, in some embodiments, the functionality provided by the bid server 203 as described below can be distributed among multiple servers. It should also be understood that functionality described herein as being performed by the bid management system 200 can, in some embodiments, be performed by the bid server 203 executing computer-readable instructions using the one or more processing units 301.

The bid server 203 communicates with one or more external devices through the communication interface 305. The external devices can include user computing devices 307, 309, 311, 313 (e.g., personal computers, laptop computers, tablet computers, smart phones, smart watches, smart televisions, and any other computing device that can communicate with the bid server 203), through which users can access the bid server 203. In some embodiments, the user computing devices 307, 309, 311, 313 communicate with the bid server 203 through a specialty software application stored on the computing device (e.g., a mobile application or "app") and/or through a portal to the bid server 203 accessed through a browser application stored on the computing device. It should be understood that the bid server 203 can communicate with the external devices using a wired or wireless connection (e.g., the Internet). For example, in some forms and arrangements, the bid management system 200 is implemented as an Internet-based web server that is accessible by any device with an Internet connection.

Figure 3:
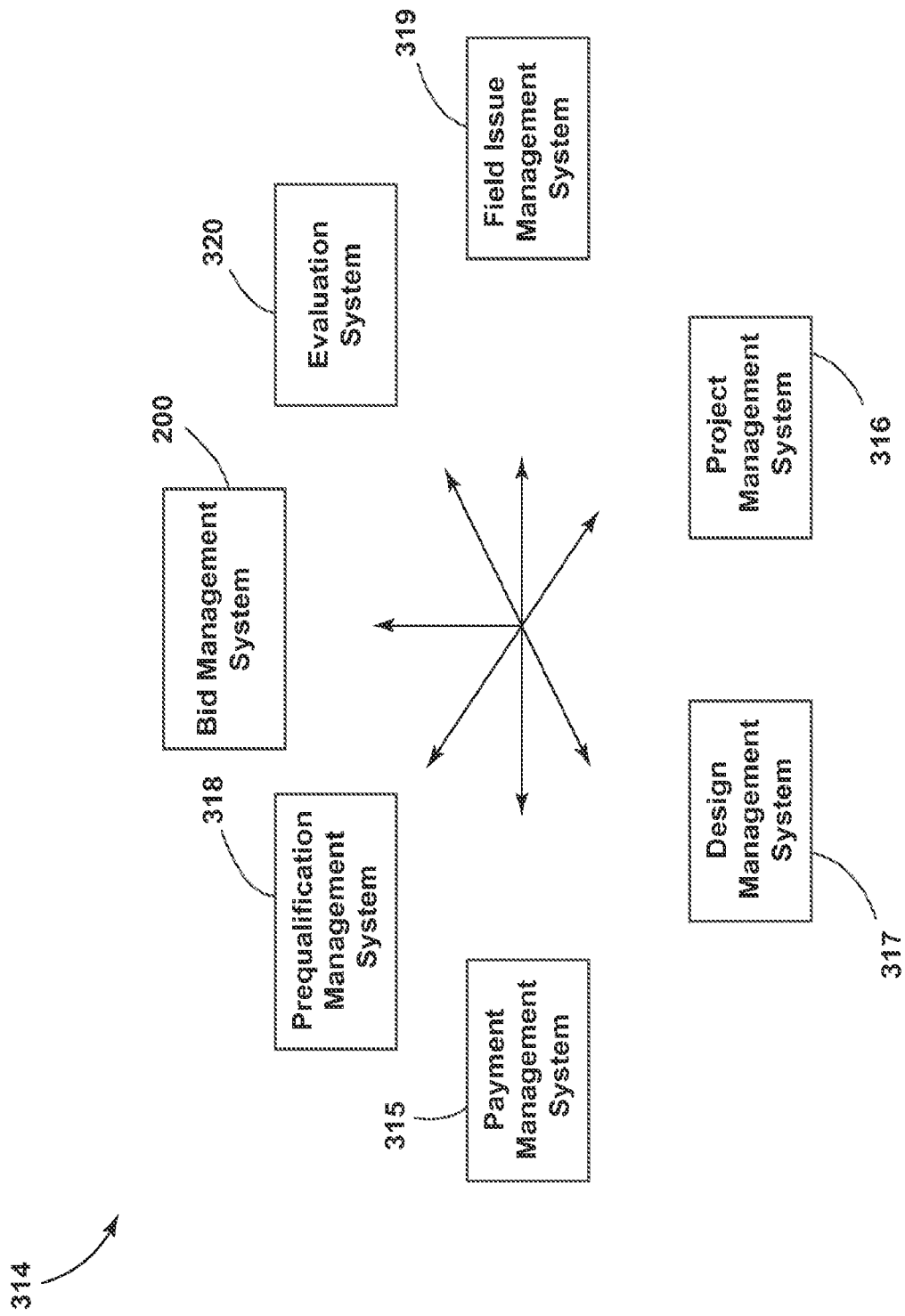
FIG. 3 is a block diagram on an integrated construction management system.

FIG. 3 illustrates an integrated construction management system 314 for managing a bid submission process. The system 314 includes the bid management system 200 and also includes other systems for managing various aspects of a construction project. For example, as illustrated in FIG. 3, the system 314 includes a payment management system 315, a project management system 316, a design management system 317, a prequalification management system 318, a field issue management system 319, and/or an evaluation system 320. It should be understood that these systems 315, 316, 317, 318, 319, and 320 can include one or more servers and other databases and devices (e.g., accessible by the bid server 203 over one or more wired or wireless connections). In some forms and arrangements, the system 314 is implemented as an Internet-based web server that is accessible by any device with an Internet connection.

While the various components of the integrated construction management system 314 as illustrated in FIG. 3 are shown as separate, distinct components, in some forms and arrangements, the various functional features of the system 314 (i.e., functional features provided by the bid management system 200, the payment management system 315, the project management system 316, the design management system 317, the prequalification management system 318, the field issue management system 319, and/or the evaluation system 320) are implemented as a single web-server. In either embodiment, the servers are specially programmed to perform all of the functions required to achieve the benefits of the system 314.

It should be understood that bid management process and related functionality described herein can be performed by the bid management system 200 or the integrated construction management system 314 (interchangeably and collectively referred to as the "system 400" in the present document).

Figure 4:
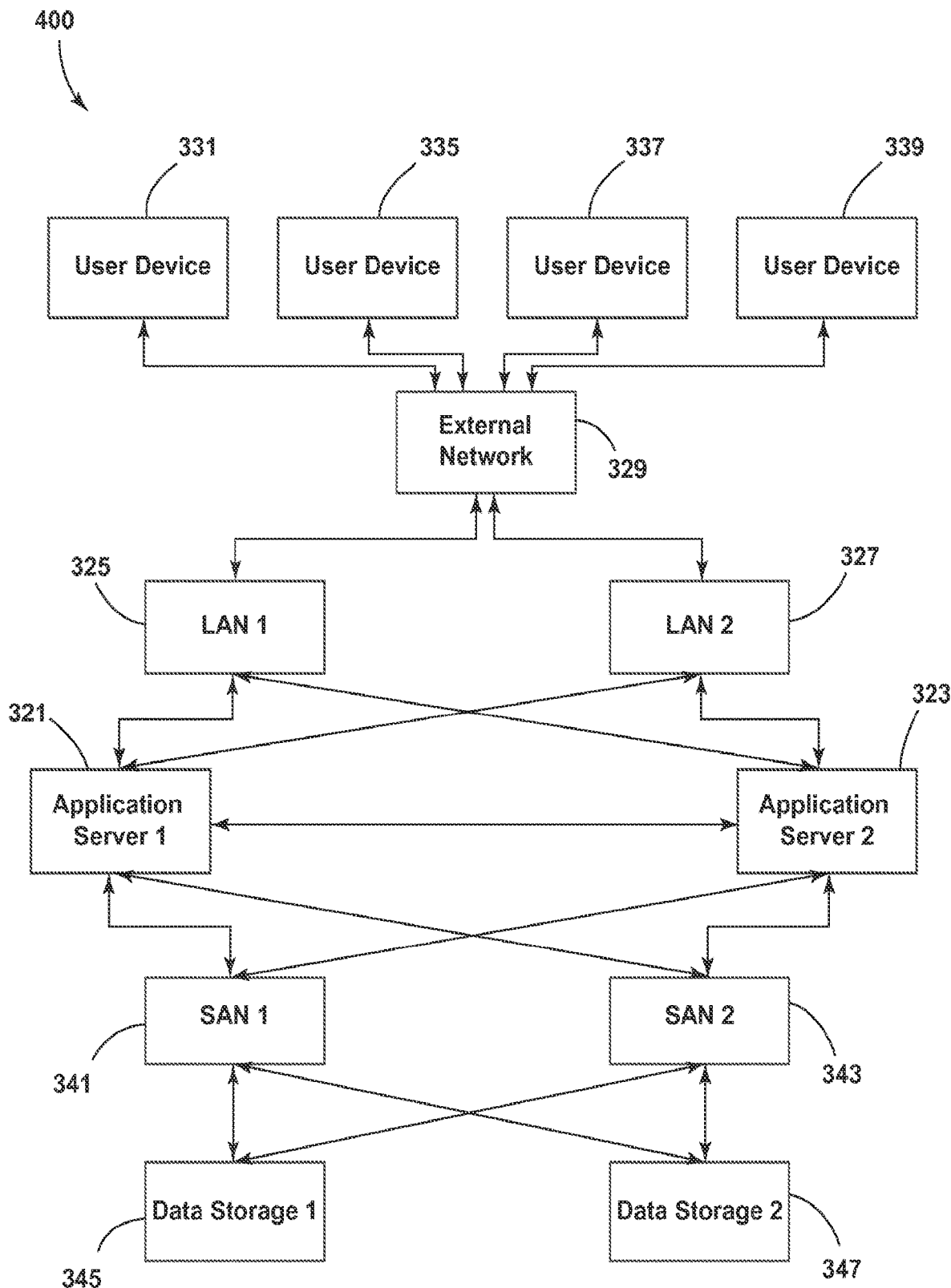
FIG. 4 is a block diagram of an implementation of the integrated construction management system of FIG. 3.

FIG. 4 illustrates a networked environment for implementing the system 400. For example, as illustrated in FIG.

4, a pair of application servers 321, 323 are accessible to users and provide the functionality described herein. In this example, the application servers 321, 323 provide redundant functionality and serve to enable more reliable processing of requests and usage from numerous users concurrently. The application servers 321, 323 are connected to two redundant local area networks 325, 327 that work with the application servers 321, 323 to provide load balancing and work queuing. The local area networks 325, 327 are connected to an external network 329 such as, for example, the Internet or an extranet. User devices 331, 335, 337, 339 access the functionality provided by the servers 321, 323 through the external network 329.

The application servers 321, 323 are also connected to two redundant storage area networks 341, 343. The application servers 321, 323 are able to access data stored on a plurality of data storage devices 345, 347 through either of the storage area networks 341, 343. In some embodiments, the multiple data storage devices 345, 347 are redundant and are synchronized on a regular schedule. In some forms and arrangements of the system 400, each data storage device is associated with a different functional component of the system 400. For example, for the integrated construction management system 314, data storage device 345 may store bid data associated with the bid management system 200, such as bid requests and bid packages, while the data storage device 347 stores project budget data and invoice generation data associated with the payment management system 315. The data storage device 345 may also store bid submission template information/requirements provided by bid solicitors, property owners, and other user organizations that receive and review bid proposal packages for construction projects. In such arrangements, additional data storage devices coupled to the storage area networks 341, 343 are provided to store data associated with other functional components of the system 400. By using multiple redundant application servers and networks (both local area networks and storage area networks), the system 400 is able to implement a single "point of entry" for the user devices to access the system while also properly balancing the loads and work queues. Users and system activity are automatically transferred from one server to another upon failure or overload of the application server. This mechanism maintains transaction and data integrity through shared memory and persisted data. Furthermore, the data stored on the data storage devices is backed up for each component at multiple data center locations such that, in the event of a loss of a data center, service can continue to be provided and the integrity of the data is not compromised.

It should be understood that the system 400 can be configured in various combinations and distributions and the arrangements illustrated in FIGS. 2-4 are provided as examples.

In some embodiments, users accessing the system 400 are assigned a user role. User roles can be associated with different permissions or rights within the system 400 that allow a user to perform various tasks. User interfaces provided by the system 400 can also be adapted to particular user roles (e.g., user, project administrator, project executive, executive, etc.). Accordingly, the system 400 can be configured to identify the role assigned to a particular user and determine, based on the assigned role, (1) whether the user is authorized to access a particular user interface or associated functionality and, if the user is authorized, (2) what particular user interface should be displayed to the user. It should be noted that when an entity is described herein as performing a function, it is really an authorized user of the entity performing that function.

Figure 5:
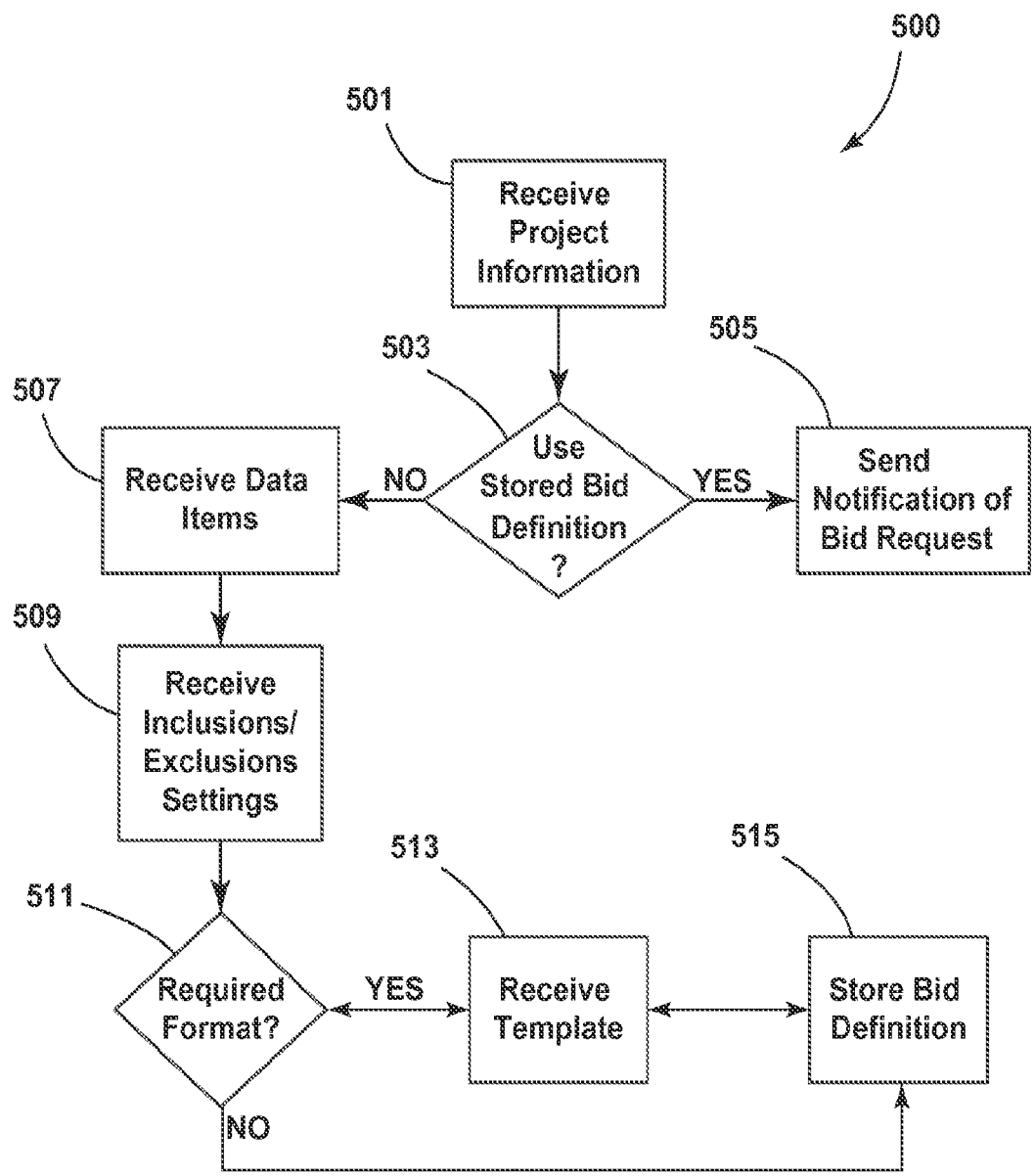
FIG. 5 is a flow chart illustrating a method of creating a bid request.

The system 400 provides functionality to assist the organization (e.g., preparing and submitting), and review of bid packages. For example, FIG. 5 illustrates a method 500, performed by the system 400, for creating a bid request. As illustrated in FIG. 5, a bid solicitor can create a bid request by providing project information for the construction project associated with the bid request (at block 501). The project information can include project blue prints, project location, property owner information, a description of the scope of work to be performed, and a deadline (e.g., a date and time) for submitting bid packages in response to the bid request. The project information can include descriptions of specific items or work that will be included or excluded from the bid request (e.g., inclusions and exclusions).

After providing the project information, the bid solicitor can select a bid definition for the request. A bid definition defines the data items to be included in a bid package that responds to the bid request. Optionally, the bid definition can also define what data items are mandatory and what data items are optional. The bid definition can also define whether additional data items can provided in a bid package (e.g., inclusions and exclusion). In addition, the bid definition can specify whether a particular format (e.g., defined by a template) is required or suggested for the bid package.

In some embodiments, the system 400 can provide one or more existing or stored bid definitions. For example, the system 400 can provide one or more default bid definitions. As described in more detail below, the stored bid definitions can also include custom bid definition previously created by the bid solicitor or other bid solicitors that use the system 400.

As illustrated in FIG. 5, when a stored bid definition is selected (e.g., by a bid solicitor) (at block 503), the system 400 sends a notification of the bid request (at block 505). Depending on settings associated (e.g., via user identification data) with the bid solicitor, the system 400 can send the notification as an "invitation-to-bid-submission" directed toward one or more specific entities. Alternatively, the system 400 can publicly post the notification (e.g., on a publically-accessible website or a website accessible to users of the system 400).

Alternatively, if a bid solicitor decides to create a new bid definition (at block 503), the system 400 prompts the bid solicitor to define the data items to be included in the bid definition (at block 507). The data items can include, but are not limited to, work and/or cost totals, work break out, work force, previous work experience, financial information, certifications, and other information about the bid provider's business operations. In some embodiments, the system 400 provides the bid solicitor with a menu of available data items, which the bid solicitor can select from to build the bid definition. The system 400 can also prompt the bid solicitor to define whether each data item is mandatory (i.e., the bid package will not be considered if the data item is missing) or optional (i.e., the bid package will be considered even if the data item is missing).

Figure 8:
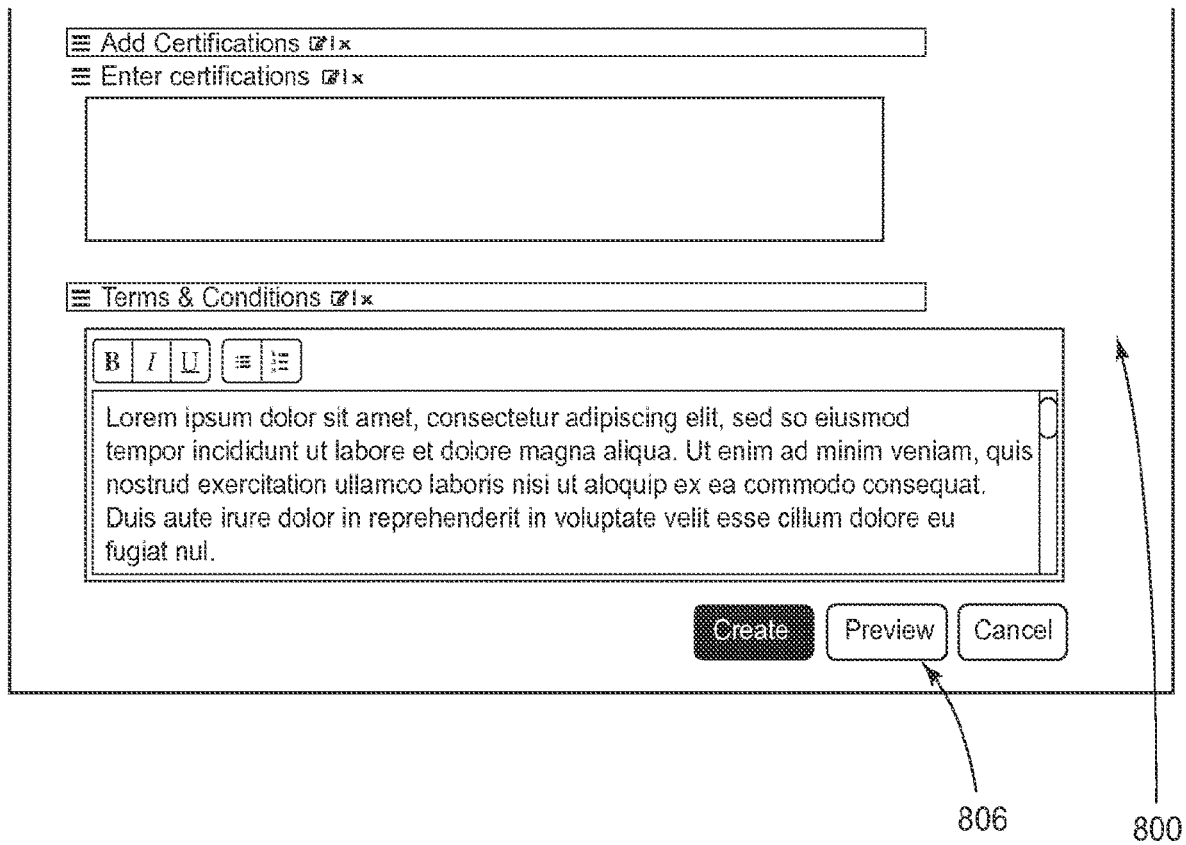

For example, FIG. 8 illustrates a graphical user interface 800 for building a bid definition by dragging and dropping data items from a menu area 802 to a definition area 804. As illustrated in FIG. 8, the drag and drop data items can include sections, price, quantity, yes/no, yes/no with adjustment, information, text box, file request, etc. The drag and drop data items may be visually presented as icons representing, for example, a "section" item that can be used to group data items within a definition. As noted below, the system 400 can use the defined sections to parse a submitted bid package into sub-packages for individual review. As illustrated in FIG. 8, within the bid definition, attachments (e.g., proof of insurance, references, etc.) and certifications can be requested, uploaded, and/or provided through the system 400. Terms and condition may also be specified (e.g., by the bid solicitor and/or a bid provider) for the bid definition. As illustrated in FIG. 8, the bid definition can be previewed (e.g., by a bid solicitor) to show how the presentation will be visually represented through the system 400 (e.g., to a bid provider) by selecting a "Preview" button 806.

In some embodiments, the system 400 also prompts the bid solicitor to identify additional settings associated with the bid definition, such as inclusions/exclusions settings (at block 509). These settings can indicate whether a bid provider is able to list its own inclusions and exclusions in a bid package. For example, the settings can indicate that a bid provider can respond to inclusions and exclusions listed by the bid solicitor and can also add inclusions and exclusions. These settings can be set by a bid solicitor (i.e., selectively activated and deactivated) on a project-by-project basis or as a global setting for the bid solicitor. In some embodiments, the system 400 provides a visual alert to warn a bid solicitor that the settings for a bid definition allow bid providers to add inclusions and exclusions.

In some embodiments, when a bid definition is created, the system 400 automatically generates a spreadsheet or matrix (e.g., a leveling matrix) based on the bid definition (e.g., including the same sections, totals and sub-totals, etc.). As described in more detail below, data can be manually entered into the spreadsheet (e.g., from the bid solicitor) and copied from submitted bid packages. The leveling matrix can generate a comparison of bids and create an estimate or budget for the project or for a bid package (e.g., to a project owner). For example, the leveling matrix can generate views of bid packages and process adjustments to the bid packages as necessary to normalize the packages for comparison purposes. Alternatively or additionally, in some embodiments, other entities and/or users may edit the spreadsheet and/or make adjustments to the bid packages.

In some embodiments, the system 400 also prompts the bid solicitor to identify whether a particular format is associated with the bid definition (at block 511). If a bid solicitor wants to define a format for bid packages, the bid solicitor selects a template that defines the desired format (at block 513). In some embodiments, the bid solicitor can select a template from pre-existing templates (e.g., default templates). Alternatively or in addition, a bid solicitor can define a custom template, which the system 400 can store and allow the bid solicitor and, optionally, other bid solicitors, to reuse for future bid requests. If the bid solicitor defines a format for bid packages, the bid solicitor can also define whether the specified format is required or merely suggested. All of this information can be incorporated into the bid definition.

Figure 9:
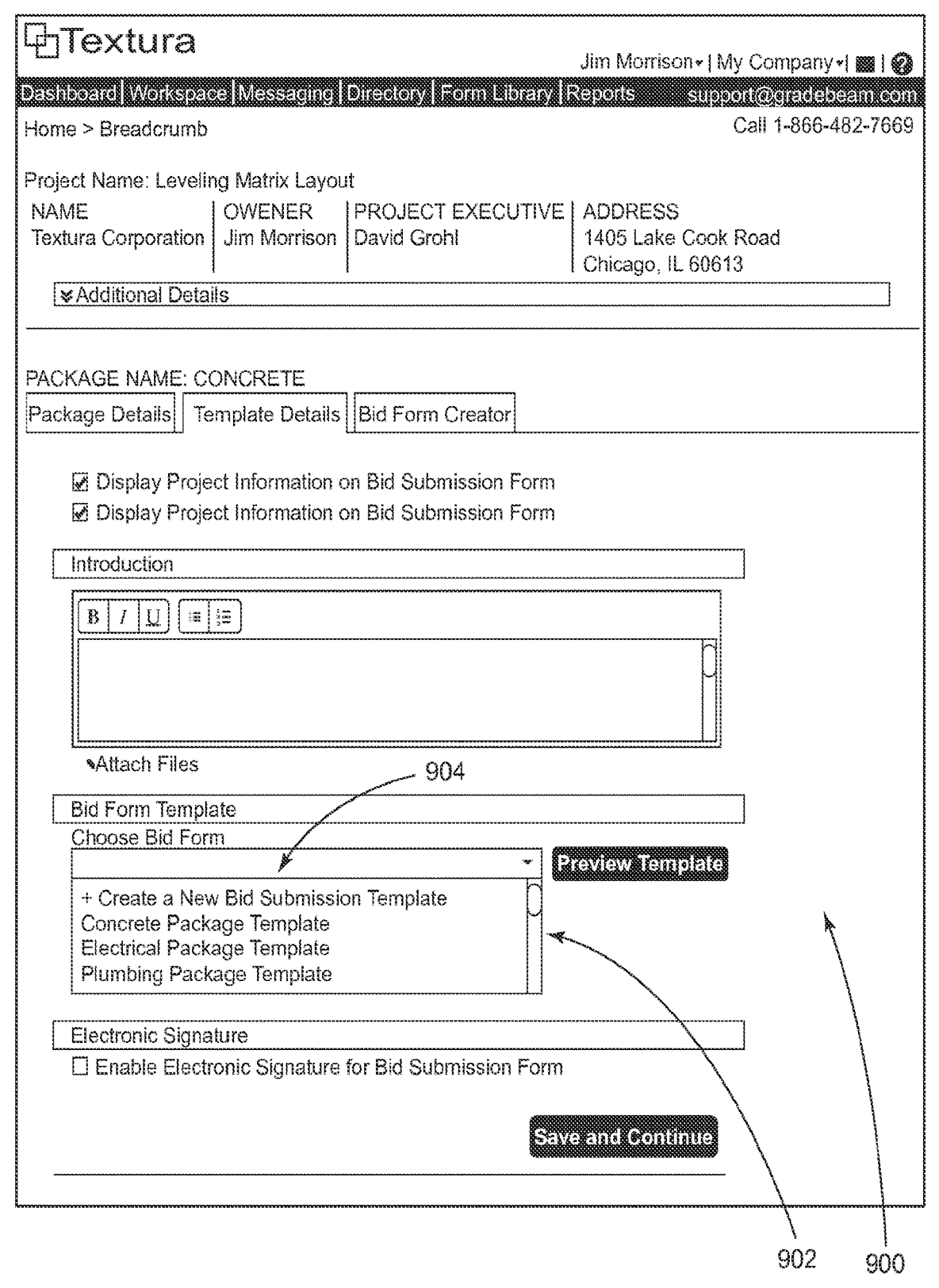

For example, FIG. 9 illustrates a graphical user interface 900 that the bid solicitor can use to select an existing template (e.g., from a dropdown list 902) or customize a template (e.g., by selecting a "Create a New Bid Submission Template" button 904). In some embodiments, in response to receiving a selection of a template, the system 400 is configured to generate definitions and/or associations between data items that are included in the bid definition. For example, in some embodiments, a template is selected prior to creating the bid definition, and, in response, the interface 800 illustrated in FIG. 8 automatically creates portions of the bid definition (e.g., visual representations of data items and/or a format or grouping of the data items) within the definition area 804 based on the selected template.

As illustrated in FIG. 5, after the bid solicitor creates the bid definition, the system 400 stores the bid definition to memory (at block 515). As noted above, the stored bid definition can be made available to the bid solicitor and, optionally, other bid solicitors using the system 400 to create bid requests. After the custom bid definition is created, the system 400 sends a notification of the bid request (at block 505) as described above. For example, FIG. 10 illustrates a graphical user interface 1000 that displays a notification of a bid request. As illustrated in FIG. 10, the notification can include details of the project (e.g., the location, owner, etc.) and the bid request (e.g., the deadline). To submit a bid package in response to the notification, a bid provider can select the "Bid Submission" tab 1002.

Figure 6:
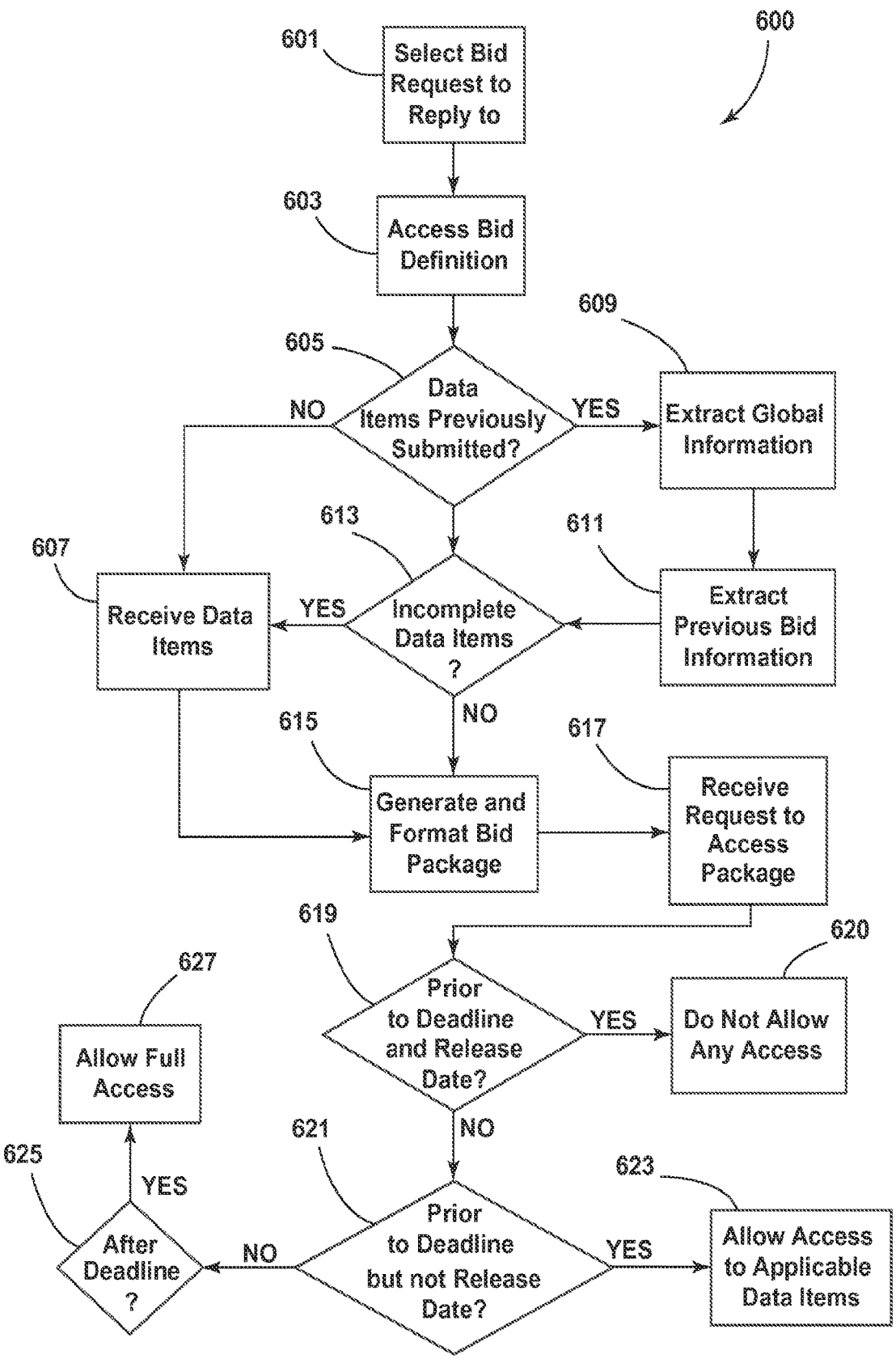
FIG. 6 is a flow chart illustrating a method of creating a bid package for submission.

In some embodiments, in addition to or as an alternative to providing bid request creation functionality, the system 400 provides bid package preparation and submission functionality. For example, FIG. 6 illustrates a method 600 performed by the system 400 for creating a bid package in response to a bid request. As illustrated in FIG. 6, to create a bid package, a bid provider selects a bid request to respond to (at block 601). As described above, the system 400 provides notifications of bid requests. If a bid provider who receives such a notification wants to respond to the bid request, the bid provider can select a button or link included in the notification to select the bid request and start the bid package creation process. Alternatively, in some embodiments, a bid provider can access the system 400 to view available bid requests, and the bid provider can select one of the available requests to respond to. For example, as illustrated in FIG. 10, the bid provider can select the "Bid Submission" tab 1002 to submit a bid package.

Based on the selected bid request (at block 601), the system 400 provides the associated project information to the bid provider. The system 400 also accesses the bid definition associated with the selected bid request (at block 603). As previously noted, the bid definition includes a list of data items to be included in a bid package (mandatory and optional items), settings regarding whether additional items can be included in a bid package (e.g., inclusions and exclusions), and whether a particular format is required for the bid package.

In some embodiments, the system 400 prompts the bid provider for the data items specified in the bid definition (e.g., while informing the bid provider regarding whether each data item is mandatory or optional) and whether the bid provider wants to add any additional data items to the bid package (e.g., if allowed based on the settings associated with the bid definition). The system 400 can then format the received data items from the user (based on a template specified in the bid definition or by the bid provider).

Figure 11:
FIG. 11 illustrates a user interface for creating a bid package for submission.

For example, FIG. 11 illustrates a graphical user interface 1100 including the bid definition previously created by the bid solicitor (see FIG. 8). The bid provider can interact with the interface 1100 to input the defined data items. In some embodiments, a bid provider can provide notes for one or more data items.

As illustrated in FIG. 11, when creating a bid package, the interface 1100 can display an overall total 1102 for the bid package and one or more sub-totals 1104 (e.g., totals for each section). The interface 1100 can also display an inclusion and/or exclusion total 1106. For example, as illustrated in FIG. 11, the bid package is associated with an exclusion total of $1,000, which may be related to a higher quality material or other option that the bid solicitor can choose to add to the project if desired.

Alternatively or in addition, the system 400 can be configured to automatically determine whether the data items for the bid definition were previously submitted by the bid provider (at block 605). For example, some of the data items may relate to contact information or other information that is stored in the bid provider's profile with the system 400. Therefore, the system 400 can be configured to automatically extract these data items for the bid package (at block 609). Similarly, if the bid provider previously used the system 400 to (e.g., recently) prepare and submit one or more bid packages, the system 400 can parse through previously-submitted bid packages and extract data items to use in the new bid package (e.g., insurance information, credentials, etc.).

In some embodiments, the system 400 is also configured to provide further bid package creation assistance for bid providers that have previously used the system 400 to prepare and submit bid proposals through the system 400. For example, the system 400 can be configured can track previously-submitted bid packages and offer suggestions for a new bid package. For example, if the system 400 determines that the bid provider previously submitted bid packages for plumbing work related to several projects similarly sized as a new project, the system 400 can use the data items from these previous bid packages (e.g., a bid amount, a proposed project budget, etc.) for a bid package for the new project. In some embodiments, a bid provider can also manually add some of these data items to the provider's global profile with the system 400 to easily complete common or fixed data items for bid packages. Also, after the system 400 extracts any data items to add to a bid package, the system 400 can allow the bid provider to manually review the data items and approve the data items or make changes as needed. Accordingly, a bid provider can define default or starting points for some data items (e.g., bid amount, budget), which the bid provider can use as a starting point for future bid packages. For example, in some constructions, a bid provider can manually establish a budget template with the system 400 that includes a list of common expenses without providing an associated dollar amount. The bid provider can then fill in specific dollar amounts applicable to the new project for each new bid package. Furthermore, in some embodiments, the bid provider can define a budget template that includes dollar amounts for static costs that generally do not vary between projects (e.g., the cost of truck rental for delivering materials, etc.) and includes empty fields for dollar values that will vary depending on the size and nature of a particular project.

After the system 400 adds any automatically extracted data items to the bid package (at blocks 609 and 611), the system 400 identifies determines whether any data items defined by the bid definition remain incomplete (at block 613). If some data items are incomplete, the system 400 prompts the bid provider for these data items (e.g., while identify to the bid provider whether each data item is mandatory or optional) (at block 607). The bid provider can provide these data items, review any data items automatically completed by the system 400, and add any allowed additional data items (e.g., exclusions and inclusions). In some embodiments, the system 400 can verify that the all of the mandatory data items are complete and can prevent the bid provider from completing and submitting the data items until all of the mandatory data items are complete.

In some embodiments, as part of creating a bid package, the bid provider can specify a release date for one or more data items. As described in more detail below, the release date allows particular data items included in a bid package (or portions of a bid package) to be made available to the bid solicitor prior to the due date associated with the bid request. For example, as noted above, in manual bidding processes, submitting a bid package before the bid deadline can be disadvantageous to a bid provider. For example, if a bid solicitor knows who the lowest bidder is before the deadline, the bid solicitor may share this information with another bid provider to allow the other bid provider an opportunity to adjust its bid package. As such, the system 400 allows a bid provider to define when individual data items or groups of data items can be accessed by the bid solicitor. The release dates set for these data items can be set as part of the bid provider's global profile and applied to all bid packages and/or can be set manually by a bid provider for a particular bid package. In some embodiments, when selecting a release date for a particular data item or group of data items, the system 400 can allow the bid provider to select (i) the date of submission of the bid package (e.g., to provide immediately release of the data items to the bid solicitor), (ii) a user-specified date, or (iii) the deadline for the bid request. In some embodiments, the deadline for the bid request can be the default release date for each data item. It should be understood that a release date, as that term is used herein, can include a date or a date and a time. For example, as illustrated in FIG. 11, the bid provider can select a "Schedule Bid Submission" button 1108 to specify a release date for one or more data items.

Accordingly, a bid provider can use the release dates to immediately release a limited set of data items from a bid package prior to the submission deadline (e.g., to allow the bid solicitor to provide feedback and make any requests for additional information or clarifications and allow the bid provider to make adjustments accordingly) while preventing the bid solicitor from accessing other data items included in the bid package (e.g., budgets and a total bid amount) until the submission deadline. As described above, the system 400 can automatically apply these release dates to control access to the data items included in a bid package by the bid solicitor. In some embodiments, however, a bid provider can disable the release date functionality (e.g., as part of the settings associated with a bid definition). The bid provider can disable the release date functionality for all bid providers or specific bid providers.

After the data items are complete, the system 400 generates a bid package based on the data items and formats the bid package according to the template specified by the bid definition, a format specified by the bid provider, or a default template (at block 615). The bid package is then stored, and the system 400 controls access to the stored bid package based on the associated release dates. In particular, when the bid solicitor requests access to the stored bid package (at block 617), the system 400 takes different actions depending on the release dates and the current date. For example, when the bid solicitor makes the request on a date that is prior to the submission deadline and prior to the earliest release date for any data item(s) (at block 619), the system 400 prevents the bid solicitor from accessing any part of the bid package (at block 620). If the bid solicitor makes the request on a date that is prior to the submission deadline but after the earliest release date for even one data item (at block 621), the system 400 allows the bid solicitor to access only those data items associated with release dates prior to the date of the request (at block 623). Similarly, if the date of the request is after the submission deadline (assuming that a release date cannot be set to a date after the submission deadline) (at block 625), the system 400 allows the bid solicitor to fully access the entire bid package (at block 627).

It should be understood that the bid solicitor can make a request to access a bid package by logging into the system 400, requesting access to all or a specific bid provided in response to a particular bid request, selecting a button or link in a notification generated by the system 400, or other mechanisms. For example, in some embodiments, the bid solicitor passively makes the request when the bid solicitor logs into the system 400 after a bid package has been submitted for one of the bid solicitor's bid request. In particular, the system 400 can be configured to query, in response to the log in, data currently accessible to the bid solicitor based on the date of the log in.

In some embodiments, in addition to or as alternatives to providing bid request creation functionality and/or bid package creation functionality, the system 400 provides bid package evaluation functionality. For example, the system 400 can assists a bid solicitor in reviewing and comparing bid packages, which allows the bid solicitor to efficiently identify and select an optimal bid package and/or an optimal data item included in a bid package. For example, FIG. 7 illustrates a method 700, performed by the system 400, of evaluating bid packages.

Figure 7:
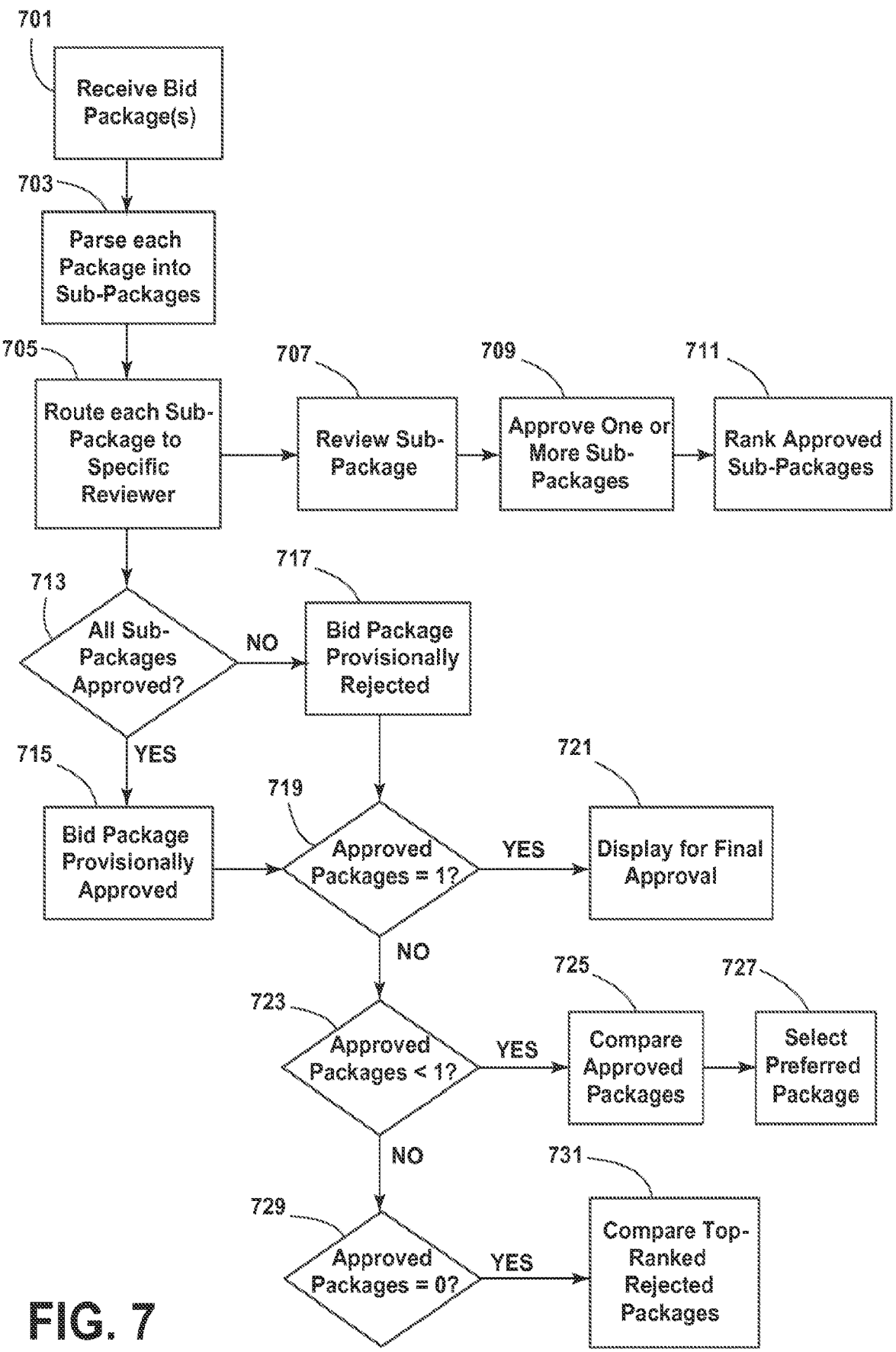
FIG. 7 is a flow chart illustrating a method of evaluating a submitted bid package.

As illustrated in FIG. 7, the system 400 receives one or more bid packages in response to a bid request created by the bid solicitor (at block 701). For some bid solicitors, certain portions of a bid package must be reviewed and approved by specific individuals, known as reviewers, who assign the portion an evaluation status (e.g., approved or rejected). For example, plumbing details included in a bid package can be reviewed and approved by a plumbing expert while details electrical details included in the bid package can be reviewed and approved by an electrical expert. Accordingly, the system 400 parses each bid package and creates "sub-packages" (at block 703). The parsing can be based on the template specified by the bid solicitor or other settings specified by the bid solicitor. In other embodiments, the system 400 can apply default parsing that automatically groups all bid packages into predefined sub-packages. For example, if a bid package is initially defined with one or more sections as described above (see FIG. 8), each section can be treated as a sub-package.

The system 400 then routes each sub-package to the appropriate reviewer (at block 705). The system 400 can identify what reviewer receives what sub-package based on routing settings specified by the bid solicitor (e.g., a mapping file) or by defined user roles. The system 400 can route a sub-package to a reviewer by notifying the reviewer of the sub-packaging needing review the next time the reviewer logs into the system 400. Alternatively or in addition, the system 400 can automatically send a notification (e.g., an email message, text message, etc.) to the reviewer informing him or her of the sub-package. In some embodiments, the notification can include a link that allows the reviewer to access and review the assigned sub-package. The system 400 can also be configured to notify particular reviews in a predefined sequence. For example, based on information specified by the bid solicitor or default rules, the system 400 can send a first sub-package to a first reviewer and send a second sub-package to a second reviewer only after the first reviewer completes his or her review of the first sub-package.

By parsing bid packages into sub-packages and routing the sub-packages to specific reviewers for approval, the system 400 allows bid solicitors to compare corresponding information from multiple bid packages regardless of the format used to submit the package or the level of work detail defined by the bid submission. For example, one bid provider may choose to submit a bid package using its own custom template while another bid provider uses the bid solicitor's suggested template, and another bid provider uses a generic or default template provided by the system 400. Regardless of the template used, the system 400 is configured to create sub-packages that include the appropriate information for each reviewer. Each sub-package can also be formatted the same to further aid a comparison and review by a reviewer.

Each reviewer reviews the received sub-package and can compare the details of multiple sub-packages using the system 400 (at block 707). The system 400 then prompts the reviewer to approve (or reject) each sub-package (at block 709). In some embodiments, the system 400 defaults sub-packages to a rejected state. Therefore, for a sub-package to the approved, the reviewer must mark the sub-package as approved (e.g., by selecting a button, check box, etc.).

When comparing sub-packages from multiple bid packages, the reviewer can approve one sub-package from one bid package. Also, in some embodiments, the system 400 allows a reviewer to approve a sub-package from more than one bid package. If the reviewer approves multiple sub-packages (i.e., from multiple bid packages), the system 400 can prompt the reviewer to rank the approved sub-packages (at block 711). Alternatively, in some embodiments, the system 400 is configured to automatically rank approved sub-packages, such as based on preferences defined by the bid solicitor (e.g., as part of the bid definition).

If each sub-package of a bid package is approved by a reviewer (at block 713), the system 400 marks the bid package as provisionally accepted (at block 715). However, if one or more sub-packages of a bid package is not approved (i.e., is rejected), the system 400 marks the bid package as provisionally rejected (at block 717). However, in some embodiments, the system 400 allows the bid solicitor to set an essentiality status for each sub-package that identifies whether a sub-package is considered "essential" or "non-essential." Accordingly, if the rejected sub-packages of a bid package are identified as "non-essential," the system 400 can marked the bid package as provisionally accepted. Accordingly, in these situations, a rejection of a "non-essential" sub-package does not result in an automatic provisional rejection of the bid package. Instead, in some embodiments, the approvals and rejections of non-essential sub-packages can be used by the system 400 to rank and compare bid packages when multiple bid packages have been provisionally approved for the same project.

After all of the bid packages have been marked as provisionally accepted or provisionally rejected, the system 400 assists the bid solicitor in selecting a single bid package as an optimal bid package for the project. For example, if only a single bid package has been provisionally accepted (at block 719), the system 400 displays the single bid package to the bid solicitor for final approval (at block 721). However, if multiple bid packages have been provisionally accepted (at block 723), the system 400 displays the provisionally-accepted bid packages to the bid solicitor and allows the bid solicitor to compare the packages (e.g., on a side-by-side comparison) (at block 725) and select one bid package, which may be the optimal bid package that is awarded the project (at block 727). If no bid package is provisionally approved (at block 728), the system 400 can be configured to display provisionally rejected bid packages (e.g., top ranked bid packages) to the bid solicitor. From the displayed bid packages, the bid solicitor can select one bid package, which may be the optimal bid package that is awarded the project (at block 727) or reopen the bid request to solicit more bid packages.

In some embodiments, the system 400 allows the bid solicitor to review and compare all bid packages regardless of their provisional status. Furthermore, in some embodiments, a bid solicitor can see all submitted bid packages (e.g., ranked and/or displayed side-by-side) and can search for particular bid packages (e.g., from particular bid providers). As sub-packages are assigned an evaluation status from a reviewer, as bid packages are assigned a provisional status by the system 400, and as a bid package is selected by the bid solicitor that is the optimal bid package for the project, the system 400 can be configured to notify the bid provider. Providing this feedback to the bid provider can improve the bid provider's understanding of the bidding process and adjust future bids accordingly. However, in some embodiments, the system 400 only notifies a bid provider of whether the bid provider's bid package was awarded the project or not.

As described above, in some embodiments, when the bid solicitor creates a bid definition, the system 400 automatically generates a spreadsheet or matrix (e.g., a leveling matrix) based on the bid definition. The leveling matrix can include entries (e.g., dollar or cost values) specified by the bid solicitor or automatically copied from a bid package. As noted above, the bid solicitor can use the generated estimate or budget to put together their own bid package (e.g., to a property owner) or as an estimate or budget for the project. For example, in some embodiments, the bid solicitor can submit their own bid package in response to the bid request, which can be treated as the initial data entries for the leveling matrix and can represent an initial estimate or budget. The bid solicitor can also manually enter values for the initial estimate or budget. Furthermore, as bid packages or bid package data items are selected as optimal bid packages and data items, the data items can be added to the leveling matrix to create a revised estimate or budget.

Figure 13:
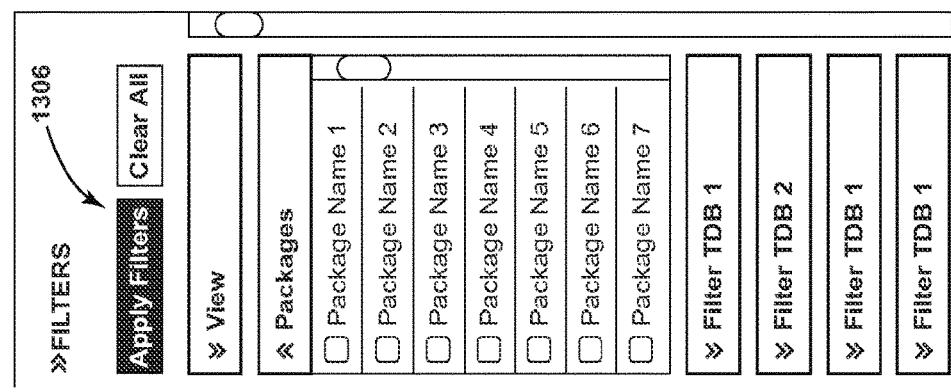

For example, FIG. 13 illustrates a graphical user interface 1300 illustrating an interactive leveling matrix. The leveling matrix includes an initial estimate or budget 1302 specified by the bid solicitor and one or more of the submitted bid packages 1304. As illustrated in FIG. 13, in some embodiments, the bid solicitor can execute one or more filters 1306 to view particular portions of the leveling matrix, particular portions of one or more bid packages, or particular bid packages.

The bid solicitor can activate a "Select Bid" button 1308 to select a particular displayed bid package as the optimal package. In some embodiments, activating the button 1308 can cause one or more data items from the selected package to populate a line item in a revised estimate or budget 1310.

Figure 12:
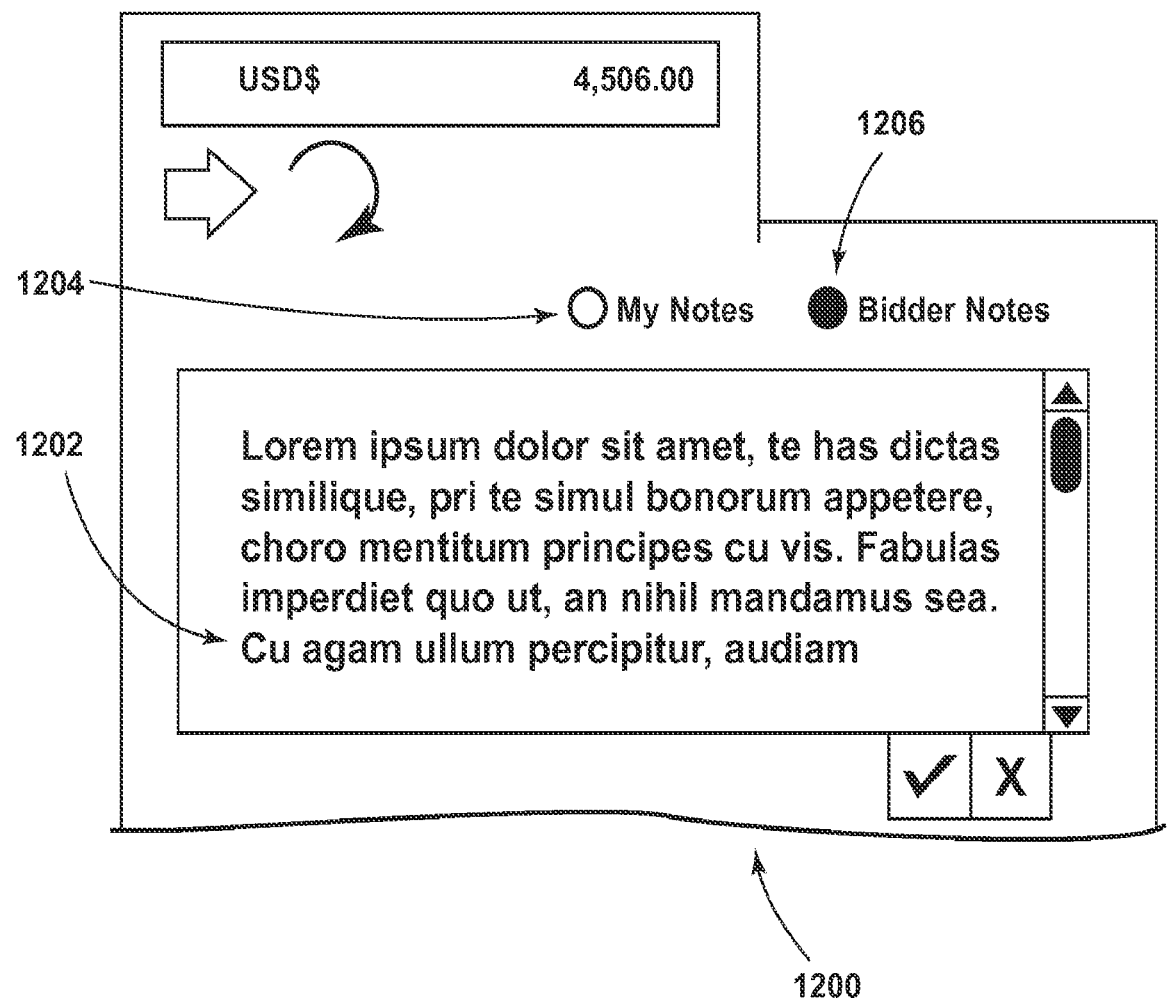
Figure 14:
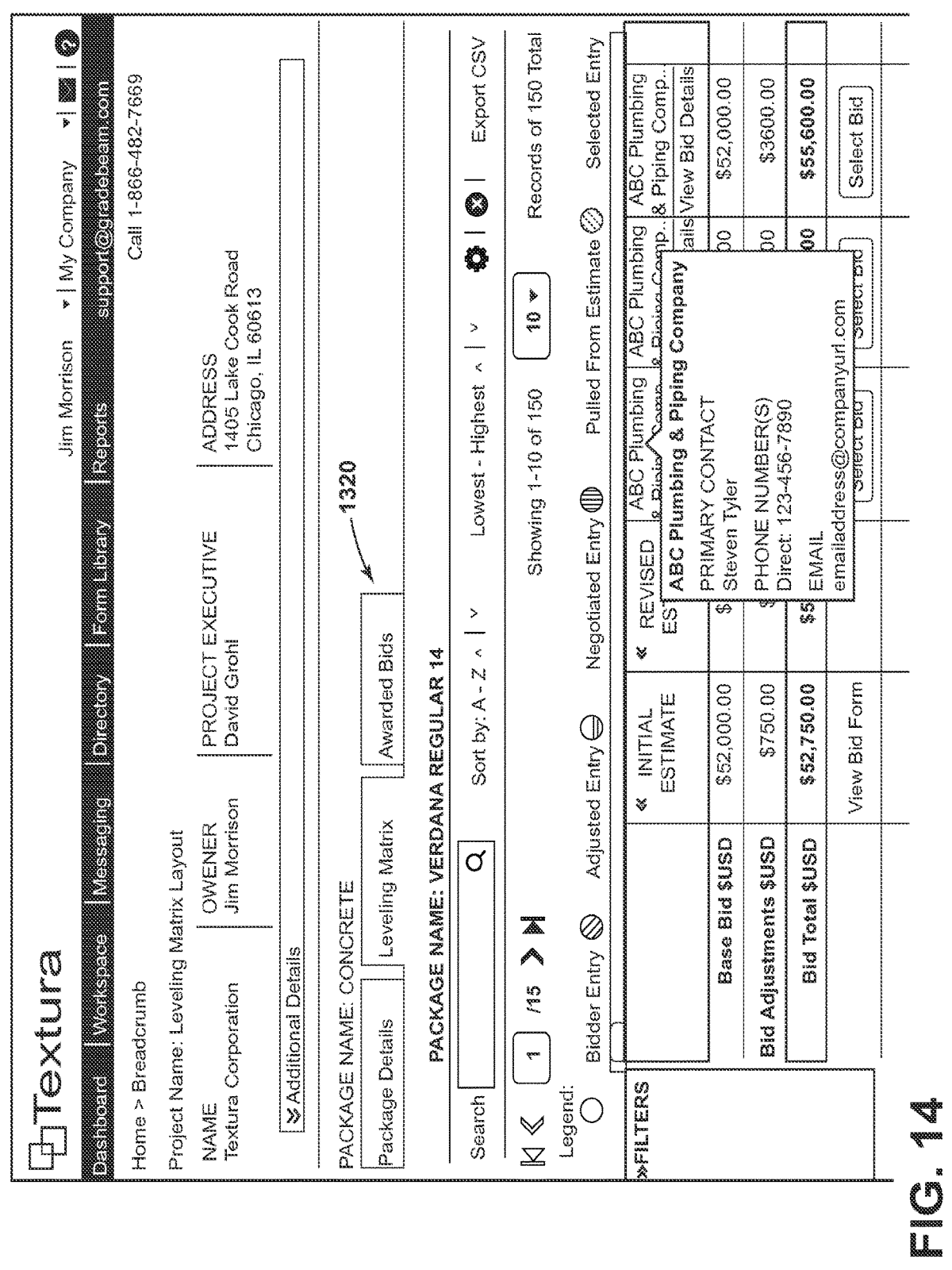

As also illustrated in FIG. 13, the leveling matrix can display overall bid package amounts 1312 and individual bid package data items 1314. In some embodiments, the bid solicitor can add notes to individual data items or mark particular data items as optimal items (e.g., using a thumbs-up icon 1316). For example, the bid solicitor can select (e.g., click-on, hover or mouse-over, etc.) a data item to access options for the item, including adding a note, marking the item as an optimal item, or manually adjusting the item. As illustrated in FIG. 14, the bid solicitor can also select (e.g., click-on, hover or mouse-over, etc.) other portions of the leveling matrix to view additional information, such as entity information and data item notes or descriptions. For example, FIG. 12 illustrates a graphical user interface 1200 that allows the bid solicitor to associate a note 1202 with a particular data item (e.g., a price). The bid solicitor can also review notes entered in by the bid provider (e.g., by selecting a "Bidder Note" radio box 1206).

As also illustrated in FIGS. 13 and 14, in some embodiments, entries in the leveling matrix can be color-coded to represent whether the entry was provided by the bid solicitor, manually adjusted by the bid solicitor, negotiated between the bid solicitor and the bid provider, pulled from an estimate, or was an entry selected by the bid solicitor from a submitted bid package. In particular, color coding indicating that an entry was "pulled from an estimate" can mean that the entry (e.g., dollar or cost value) was copied from the initial estimate. Similarly, color coding indicating that an entry was "selected" can mean that the entry was selected by the bid solicitor and copied to the revised estimate. The color coding aids the bid solicitor in managing the creation of the leveling matrix.

As illustrated in FIG. 14, the interface can also include an "Awarded Bids" tab 1320 that the bid solicitor can select to view bid packages previously selected by the bid solicitor as an optimal bid for the project. Accordingly, the bid solicitor can use the tab 1320 to keep track of what bid packages have been selected and make changes as necessary.

It should be understood that certain aspects of the functionality described herein can be provided to a bid solicitor even if the bid provider is not using the system 400 and vice versa. For example, a bid solicitor can use the system 400 to create a bid request and a bid provider can submit a bid package in response to the bid request outside of the system 400 (e.g., by email or postal mail). In this situation, the system 400 can allow the bid solicitor to enter data from the bid package into the system 400 to determine whether the bid package is complete and to compare the bid package to other bid packages (e.g., received through the system 400).

Similarly, a bid provider can use the system 400 to construct a bid package for bid request posted outside of the system 400. In such cases, the bid provider can create a bid request within the system 400 as described above based on the posted bid request. The bid provider can then use the system 400 to construct the bid package (e.g., automatically extract data from the system 400, ensure completeness, etc.). Once the system 400 creates the bid package, the system 400 can allow the bid provider to print out the bid package (e.g., for submission in hard copy) or send an electronic version of the bid package (e.g., via email or fax) to the bid solicitor). Also, in some embodiments, a bid solicitor that is not a subscriber to the system 400 can be given access to view a bid package submitted by a bid provider through the system 400. The bid solicitor can receive the bid package electronically and evaluate the bid package as described. In some constructions, a non-subscribing bid solicitor is provided access to a limited subset of evaluation functionality provided by the system 400. However, the system 400 can prompt the bid solicitor to become a subscribing user of the system 400.

In some embodiments, the system 400 can also be configured to interact with other external systems, such as to facilitate the posting of bid requests, the creation of bid packages, and the review of submitted bid packages.

Thus, embodiments of the invention provide, among other things, systems and methods for creating bid requests, generating bid packages, providing access to submitted bid packages to aid review and comparison, facilitating approval of a bid package, and combinations thereof.

Embodiments of the invention also provide interfaces that allow a user to select and manipulate visual elements to generate or create interface user interfaces for a bid request, a bid package, and evaluation of a submitted bid package through efficient interactions and tools. Accordingly, the systems and methods described herein provide many advantages over manual processes beyond automation of such processes. For example, using the interfaces allows a user to build a bid definition with user-selectable data items in a user-selectable specific format, which can be reused for subsequent bid requests. Furthermore, using the interfaces allows a user to create a bid package and associate different release dates with individual data items that are implemented by the system to ensure and control confidentiality as specified by the bid provider. Further still, using the interfaces provided by the system allow a bid solicitor to visually compare submitted bid packages and make decisions accordingly.

Although various embodiments of the invention have been described, it will be apparent to those of ordinary skill in the art that many more embodiments and implementations are possible that are within the scope of the invention. Those of skill in the art will appreciate that embodiments not expressly illustrated herein may be practiced within the scope of the claims, including that features described herein for different embodiments may be combined with each other and/or with currently-known or future-developed technologies while remaining within the scope of the claims. Although specific terms are employed herein, they are used in a generic and descriptive sense only and not for purposes of limitation unless specifically defined by context, usage, or other explicit designation. It is therefore intended that the foregoing detailed description be regarded as illustrative rather than limiting. And, it should be understood that the following claims, including all equivalents, are intended to define the spirit and scope of this invention. Furthermore, the advantages described above are not necessarily the only advantages of the invention, and it is not necessarily expected that all of the described advantages will be achieved with every embodiment. In the event of any inconsistent disclosure or definition from the present application conflicting with any document incorporated by reference, the disclosure or definition herein shall be deemed to prevail. Various features and advantages of the invention are set forth in the following claims.

What is claimed is:

1. A computer-implemented method executed by a processor of a server for submitting bid packages for a construction project, the method comprising:
   providing non-transitory computer-readable instructions to the processor;
   executing, by the processor, the non-transitory computer-readable instructions to perform the limitations comprising:
      receiving, from a bid solicitor, a bid definition for a bid request, the bid definition including a plurality of bid definition data items and the bid request associated with a deadline;
      sending, to a bid provider, a notification of the bid request;
      making the bid definition accessible to the bid provider;
      receiving a plurality of bid response data items associated with the bid provider, each of the plurality of bid response data items associated with the bid provider corresponding to one of the plurality of bid definition data items included in the bid definition;
      receiving, from the bid provider, a release date for at least one of the plurality of bid response data items associated with the bid provider through an interface accessible by the bid provider over a network connection, wherein the at least one of the plurality of bid response data items includes information on which the bid provider accepts feedback from the bid solicitor;
      receiving, from the bid provider, an input to either enable or disable access control based on the release date;
      automatically generating a bid package based on the plurality of bid response data items;
      parsing the bid package into a plurality of sub-packages;
      accepting, from the bid solicitor, an essentiality status input for each sub-package designating a sub-package either essential or non-essential:
      storing the bid package to at least one database;
      receiving, from the bid solicitor, an access request to access the bid package through an interface accessible by the bid solicitor over a network connection;
      when the access request is received prior to the deadline and prior to the release date, automatically preventing the bid solicitor from accessing the bid package;
      when the access request is received prior to the deadline but after the release date and when access control based on the release date is enabled,
         (i) automatically preventing the bid solicitor from accessing the bid package except for the at least one of the plurality of bid response data items,
         (ii) automatically allowing the bid solicitor to submit an information request for additional information for the at least one of the plurality of bid response data items, and
         (iii) in response to receiving the information request, automatically notifying the bid provider of the request; and
      when the access request is received after the deadline, automatically allowing the bid solicitor to access the bid package
   assigning an evaluation status for each sub-package of the bid package, wherein the evaluation status includes approved or rejected; and
   ranking the bid package among other bid packages based on whether one or more of the sub-packages assigned an evaluation status of rejected is designated essential.

2. The method of claim 1, further comprising:
   identifying a reviewer associated with each of the plurality of sub-packages;
   for each of the plurality of sub-packages,
      making a sub-package accessible to the identified reviewer, and
      receiving, from the matched reviewer, the evaluation status for the sub-package, wherein the evaluation status includes approved or rejected;
   automatically assigning the bid package a provisional status including automatically marking the bid package as provisionally accepted if each of the plurality of sub-packages has an evaluation status of approved, and automatically marking the bid package as provisionally rejected if one or more of the plurality of sub-packages has an evaluation status of rejected; and
   receiving, from the bid solicitor, a final status of the bid package.

3. The method of claim 2, further comprising notifying the bid provider of the final status of the bid package, the provisional status of the bid package, or the evaluation status of one of the plurality of sub-packages.

4. The method of claim 3, wherein automatically assigning the provisional status to the bid package includes assigning the provisional status based on an essentiality status and the evaluation status of at least one of the plurality of sub-packages.

5. The method of claim 1, wherein receiving the bid definition includes receiving a selection of one of a plurality of stored bid definitions.

6. The method of claim 1, wherein receiving a bid definition includes creating, by the bid solicitor, a custom bid definition by selecting the plurality of bid definition data items.

7. The method of claim 1, wherein automatically generating the bid package includes formatting the bid package based on a template associated with the bid definition.

8. The method of claim 1, wherein receiving the plurality of bid response data items associated with the bid provider includes automatically extracting at least one of the plurality of bid response data items associated with the bid provider from stored data.

9. The method of claim 8, wherein automatically extracting the at least one of the plurality of bid response data items associated with the bid provider from stored data includes extracting the at least one of the plurality of bid response data items from a profile associated with the bid provider.

10. The method of claim 8, wherein automatically extracting the at least one of the plurality of bid response data items associated with the bid provider from stored data includes extracting the at least one of the plurality of bid response data items from a previously-created bid package associated with the bid provider.

11. The method of claim 8, wherein automatically extracting the at least one of the plurality of bid response data items associated with the bid provider from stored data includes defining the at least one of the plurality of bid response data items based on historical data associated with the bid provider.

12. The method of claim 1, wherein receiving the release date includes receiving a release date and a release time for the at least one of the plurality of bid response data items associated with the bid provider.

13. A system for submitting construction bids, the system comprising: a server including a processing unit configured to:
receive, from a bid solicitor, a bid request including a plurality of bid definition data items and a deadline, the bid request associated with a construction project,
send, to each of a plurality of bid providers, a notification of the bid request,
make the bid request accessible to the plurality of bid providers,
receive, for each of the plurality of bid providers, a plurality of bid response data items associated with the bid provider wherein each of the plurality of bid response data items associated with the bid provider corresponds to one of the plurality of bid definition data items included in the bid request,
receive, from each of the plurality of bid providers, a release date for at least one of the plurality of bid response data items associated with the bid provider, wherein the at least one of the plurality of bid response data items includes information on which the bid provider accepts feedback from the bid solicitor,
receive, from each of the plurality of bid providers, an input to either enable or disable access control based on the release date;
generate, for each of the plurality of bid providers, a bid package based on the plurality of bid response data items associated with the bid provider,
parse the bid package into a plurality of sub-packages;
accept, from the bid solicitor, an essentiality status input for each sub-package designating a sub-package either essential or non-essential;
store the bid packages to at least one database,
receive, from the bid solicitor, an access request to access the bid packages,
when the access request is received prior to the deadline and prior to the release date, prevent the bid solicitor from accessing the bid packages,
when the access request is received prior to the deadline but after the release date and when access control based on the release date is enabled,
 (i) automatically prevent the bid solicitor from accessing the bid packages except for the at least one of the plurality of bid response data items included in each bid package associated with the release date,
 (ii) automatically allow the bid solicitor to submit an information request for additional information for the at least one of the plurality of bid response data items, and
 (iii) in response to receiving the information request, automatically notify the bid provider of the request, and
when the access request is received after the deadline, allow the bid solicitor to access the bid packages;
assign an evaluation status for each sub-package of the bid package, wherein the evaluation status includes approved or rejected; and
rank the bid package among other bid packages based on whether one or more of the sub-packages assigned an evaluation status of rejected is designated essential.

14. The system of claim 13, where the processing unit is further configured to:
match each of the plurality of sub-packages to one of a plurality of reviewers;
for each of the plurality of sub-packages:
 present a sub-package to the matched reviewer in a standard format, and
 receive, from the matched reviewer, the evaluation status for the sub-package, wherein the evaluation status includes approved or rejected;
assign each bid package a provisional status by
 marking a bid package as provisionally accepted if each of the plurality of sub-packages included in the bid package has an evaluation status of approved, and
 marking a bid package as provisionally rejected if one or more of the plurality of sub-packages included in the bid package has an evaluation status of rejected; and
receive, from the bid solicitor, a selection of one of the bid packages awarded the construction project.

15. The system of claim 14, wherein the processing unit is further configured to rank the bid packages based on the evaluation status of the plurality of sub-packages included in a bid package and whether a provisionally rejected sub-package included in the bid package is an essential sub-package.

16. The system of claim 14, wherein the processing unit is configured to present the sub-package to the matched reviewer in a standard format by formatting all sub-packages provided to the reviewer the same.

17. The system of claim 13, wherein the processing unit is configured to allow the bid solicitor to access the bid packages by displaying at least two of the bid packages side-by-side.

18. The system of claim 13, wherein the processing unit is further configured to receive from the bid solicitor a request for additional information for one of the bid packages and notifying the bid provider associated with the one of the bid packages of the request.

19. The system of claim 18, wherein the processing unit is configured to receive the request for additional information prior to the deadline.

20. A system for submitting construction bids, the system comprising: a server including a processing unit configured to:
receive a bid definition for a bid request, the bid definition including a plurality of bid definition data items and the bid request associated with a deadline;
receive a plurality of bid response data items associated with a bid provider wherein each of the plurality of bid response data items associated with the bid provider corresponds to one of the plurality of bid definition data items included in the bid definition,
receive, from the bid provider, a release date for at least one of the plurality of bid response data items associated with the bid provider, the release date including a date and a time, wherein the at least one of the plurality of bid response data items includes information on which the bid provider accepts feedback from the bid solicitor,
receive, from the bid provider, an input to either enable or disable access control based on the release date:
generate, for the bid provider, a bid package based on the plurality of bid response data items associated with the bid provider,
parse the bid package into a plurality of sub-packages:
accept, from the bid solicitor, an essentiality status input for each sub-package designating a sub-package either essential or non-essential:
store the bid packages to at least one database,
receive, from the bid solicitor, an access request to access the bid package,
when the access request is received prior to the deadline and prior to the release date, prevent the bid solicitor from accessing the bid package,
when the access request is received prior to the deadline but after the release date and when access control based on the release date is enabled,
 (i) automatically prevent the bid solicitor from accessing the bid package except for the at least one of the plurality of bid response data items associated with the release date,
 (ii) automatically allowing the bid solicitor to submit an information request for additional information for the at least one of the plurality of bid response data items, and
 (iii) in response to receiving the information request, automatically notifying the bid provider of the request, and
when the access request is received after the deadline, allow the bid solicitor to access the bid package
assigning an evaluation status for each sub-package of the bid package, wherein the evaluation status includes approved or rejected; and
ranking the bid package among other bid packages based on whether one or more of the sub-packages assigned an evaluation status of rejected is designated essential.

* * * * *